United States Patent
Santavicca (10) Patent No.: US 7,885,603 B2
(45) Date of Patent: Feb. 8, 2011

(54) IN-VEHICLE UNIT COMMUNICATION PROTOCOL

(75) Inventor: Joseph Santavicca, Macomb, MI (US)

(73) Assignee: Audiovox Corporation, Hauppauge, NY (US)

( * ) Notice: Subject to any disclaimer, the term of this patent is extended or adjusted under 35 U.S.C. 154(b) by 636 days.

(21) Appl. No.: 11/674,941

(22) Filed: Feb. 14, 2007

(65) Prior Publication Data

US 2008/0192659 A1   Aug. 14, 2008

(51) Int. Cl.
*H04B 7/00* (2006.01)
*G01M 17/00* (2006.01)

(52) U.S. Cl. .................. 455/41.2; 370/280; 701/2; 701/29; 701/32; 701/36

(58) Field of Classification Search ............ 340/825.22, 340/825.69, 825.72, 531, 426.25, 426.34, 340/438; 701/2, 36, 1, 24, 33, 35
See application file for complete search history.

(56) References Cited

U.S. PATENT DOCUMENTS

| | | | | |
|---|---|---|---|---|
| 6,144,315 A | * | 11/2000 | Flick | 340/825.69 |
| 6,650,247 B1 | * | 11/2003 | Hayes | 340/825.22 |
| 6,785,595 B2 | | 8/2004 | Kominami et al. | |
| 2006/0149431 A1 | | 7/2006 | Wilson et al. | |

OTHER PUBLICATIONS

International Search Report dated May 23, 2008 in corresponding International Appln No. PCT/US2008/052298.

* cited by examiner

*Primary Examiner*—Matthew D Anderson
*Assistant Examiner*—Gennadiy Tsvey
(74) *Attorney, Agent, or Firm*—F. Chau & Associates, LLC (57) ABSTRACT

A vehicle control system communication method, including: receiving, at an in-vehicle unit (IVU), a command message from a hand-held unit (HHU), wherein the command message includes a first command frame and a second command frame; and sending, from the IVU, a response message to the HHU, wherein the response message includes a first response frame, wherein the first response frame is sent in a time period between the reception of the first command frame and the reception of the second command frame.

26 Claims, 6 Drawing Sheets

IN-VEHICLE UNIT COMMUNICATION PROTOCOL

BACKGROUND OF THE INVENTION

1. Technical Field

The present invention relates to bidirectional communication between hand-held units (HHUs) and in-vehicle units (IVUs), and more particularly, to an IVU communication protocol.

2. Discussion of the Related Art

When communicating between a hand-held unit (HHU) such as a two-way remote transmitter and an in-vehicle unit (IVU) such as a vehicle control system, once an inbound message from the HHU is received by the IVU, response data is sent from the IVU to the HHU in a bundle after a predetermined time out. Generally, this time out takes about two to five seconds. IN addition, the response data is generally sent from the IVU for about five to ten seconds. This is done to improve the chances of the HHU receiving the response data.

However, during the time in which the response data is sent to the HHU, no other inbound messages can be received by the IVU. Further, since the response data is set for such a long time, there is a perceivable delay in actions performed by the vehicle and feedback reaction to the HHU. Accordingly, there is a need for a technique of reducing the amount of time it takes to send response data from an IVU to an HHU so that there is essentially no perceptible delay in actions performed by the vehicle and feedback reaction by the HHU.

SUMMARY OF THE INVENTION

In an exemplary embodiment of the present invention, a vehicle control system communication method, comprises receiving, at an in-vehicle unit (IVU), a command message from a hand-held unit (HHU), wherein the command message includes a first command frame and a second command frame, and sending, from the IVU, a response message to the HHU, wherein the response message includes a first response frame, wherein the first response frame is sent in a time period between the reception of the first command frame and the reception of the second command frame.

The time period between the reception of the first command frame and the reception of the second command frame is approximately 100 ms or approximately 150 ms. The first response frame is sent approximately 50 ms or approximately 75 ms after the first command frame is received.

When the command message further includes a third command frame, the response message includes a second response frame, wherein the second response frame is sent in a time period between the reception of the second command frame and the reception of the third command frame.

The time period between the reception of the second command frame and the reception of the third command frame is approximately 100 ms or approximately 150 ms. The second response frame is sent approximately 50 ms or approximately 75 ms after the second command is received.

The method further comprises receiving, at the HHU, the response message from the IVU. When the IVU receives the first command frame from the HHU a communication session begins and when the HHU receives a last response frame from the IVU the communication session ends. When the communication session ends, the HHU does not receive another response message from the IVU until another communication session begins.

The method further comprises resending, from the IVU, the response message until the IVU receives another command message from the HHU. The method further comprises validating, at the IVU, a learn command message received from the HHU or a valid setup request from an HHU already learned, by sending, from the IVU, a series of calibration frames to the HHU. The series of calibration frames is sent approximately 100 ms or approximately 150 ms apart.

The command message and the response message are wirelessly transmitted using a radio frequency (RF), ZigBee, Near Field Communication (NFC), Bluetooth, ultra-wide band or infrared technique.

In an exemplary embodiment of the present invention, a vehicle control system, comprises: an HHU for transmitting a command message, wherein the command message includes a first command frame and a second command frame, and an IVU for receiving the command message and sending a response message to the HHU, wherein the response message includes a first response frame, wherein the first response frame is sent in a time period between the reception of the first command frame and the reception of the second command frame.

The system further comprises a vehicle control module for receiving a command from the IVU associated with the command message receiving from the HHU and for instructing vehicle components to execute functions in accordance with the command received from the IVU.

The vehicle control module communicates with the vehicle components via a vehicle data bus. The vehicle data bus is a controller area network (CAN) data bus. A vehicle component executes a function in accordance with the command received from the IVU in response to the instruction of the vehicle control module.

The IVU instructs the vehicle components to execute functions associated with the command message received from the HHU. The IVU communicates with the vehicle components via a vehicle data bus. The vehicle data bus is a CAN data bus. A vehicle component executes a function associated with the command message received from the HHU in response to a command received form the IVU.

When the IVU is hardwired to vehicle components, the IVU instructs the vehicle components to execute functions associated with the command message received from the HHU via the hardwired connection. A vehicle component executes a function associated with the command message received from the HHU in response to a command received from the IVU via the hardwired connection.

The command message and the response message are wirelessly transmitted using an RF, ZigBee, NFC, Bluetooth, ultra-wide band or infrared technique.

In an exemplary embodiment of the present invention, a method for wirelessly communicating between a remote transceiver and a vehicle control system, comprises receiving, at a vehicle control unit, a command message from a remote transceiver, wherein the command message includes a first command frame and a second command frame, and sending, from the vehicle control unit, a response message to the remote transceiver, wherein the response message includes a first response frame, wherein the first response frame is interleaved between the first command frame and the second command frame.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
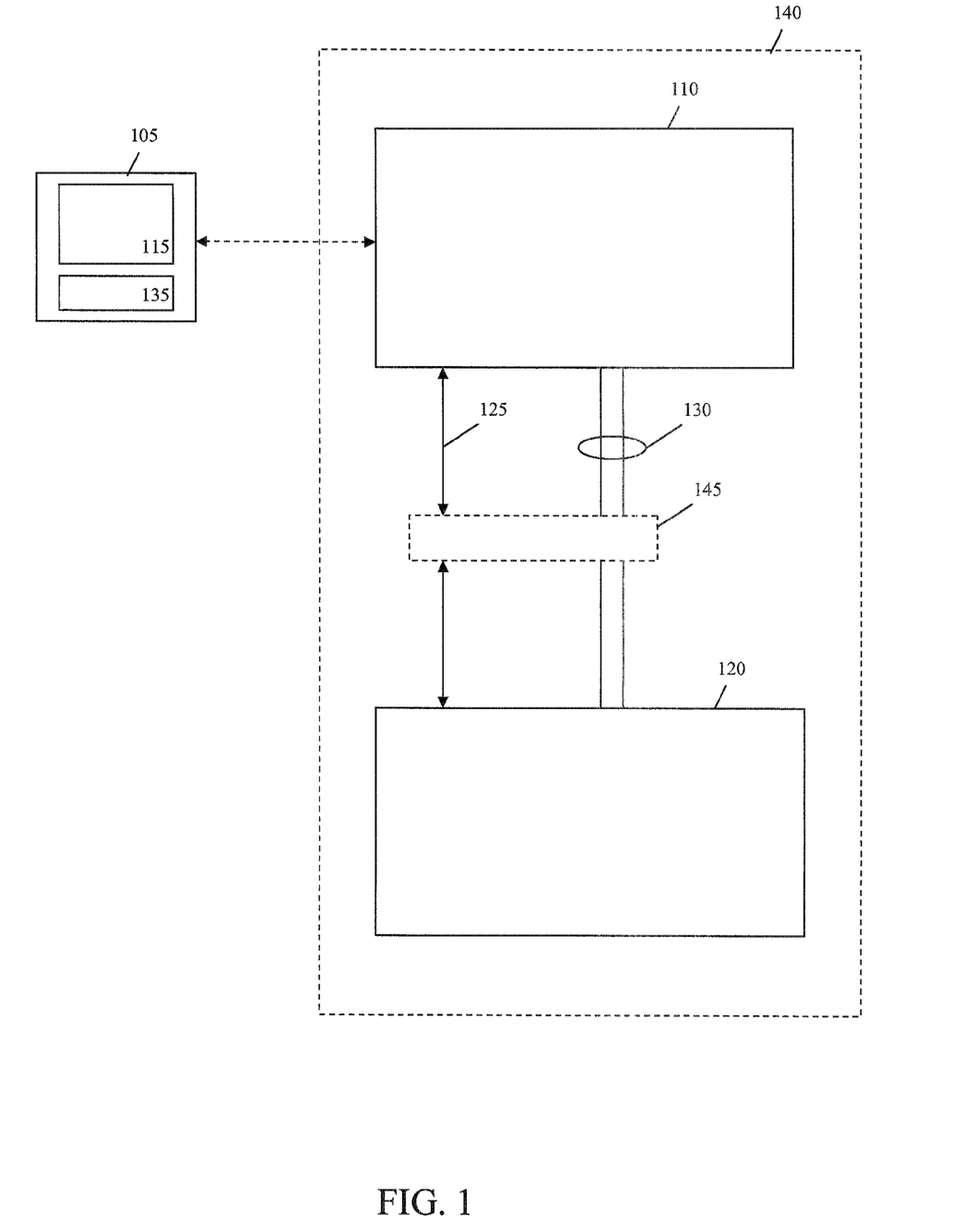
FIG. 1 illustrated a hand-held unit (HHU) and an in-vehicle unit (IVU) in which exemplary embodiments of the present invention may be implemented.

FIG. 1 illustrates a hand-held unit (HHU) and an in-vehicle (IVU) in which exemplary embodiments of the present invention may be implemented.

In FIG. 1, an HHU 105 such as a two-way remote transmitter wirelessly transmits a command message to an IVU 110 such as a two-way vehicle control system, to cause the IVU 110 to instruct vehicle components 120 to perform, among others, security, keyless entry and/or remote start related functions. In response to the command message, assuming the HHU 105 is a learned transmitted, the IVU 110 wirelessly transmits a response message to the HHU 105.

The HHU 105 includes at least a display 115 for displaying command messages to be transmitted to the IVU 110 and response messages received from the IVU 110, and an input 135 for inputting the command messages. The HHU 105 is capable of transmitting and receiving wireless signals via a number of communication schemes such as, but not limited to, radio frequency (RF), ZigBee, Near Field Communication (NFC), Bluetooth, ultra-wide band or infrared.

The IVU 110 is an interface module that can be installed in a vehicle 140 when the vehicle 140 is manufactured or installed in the vehicle 140 after the vehicle 140 is manufactured as an aftermarket product. The IVU 110 is hardwired to the vehicle 140 via power, ground and/or ignition connections and communicates with the vehicle components 120 such as dome light, doors, hood, trunk, memory seat, defrost, heated seats, etc., via a vehicle data bus 125 such as a controller area network (CAN) data bus. The IVU 110 can also communicate with the vehicle components 120 via hardwired connections 130 between the IVU 110 and the vehicle components 120. The IVU 110 is capable of transmitting and receiving wireless signals via a number of communication schemes such as, but not limited to, RF, ZigBee, NFC, Bluetooth, ultra-wide band or infrared.

The IVU 110 can also be connected to a pre-existing vehicle control module 145. For example, as shown in FIG. 1, the vehicle control module 145 can be located in between the IVU 110 and the vehicle components 120. In this configuration, the vehicle control module 145 can be connected to the vehicle components 120 via the vehicle data bus 125 or via the hardwired connections 130.

Figure 2:
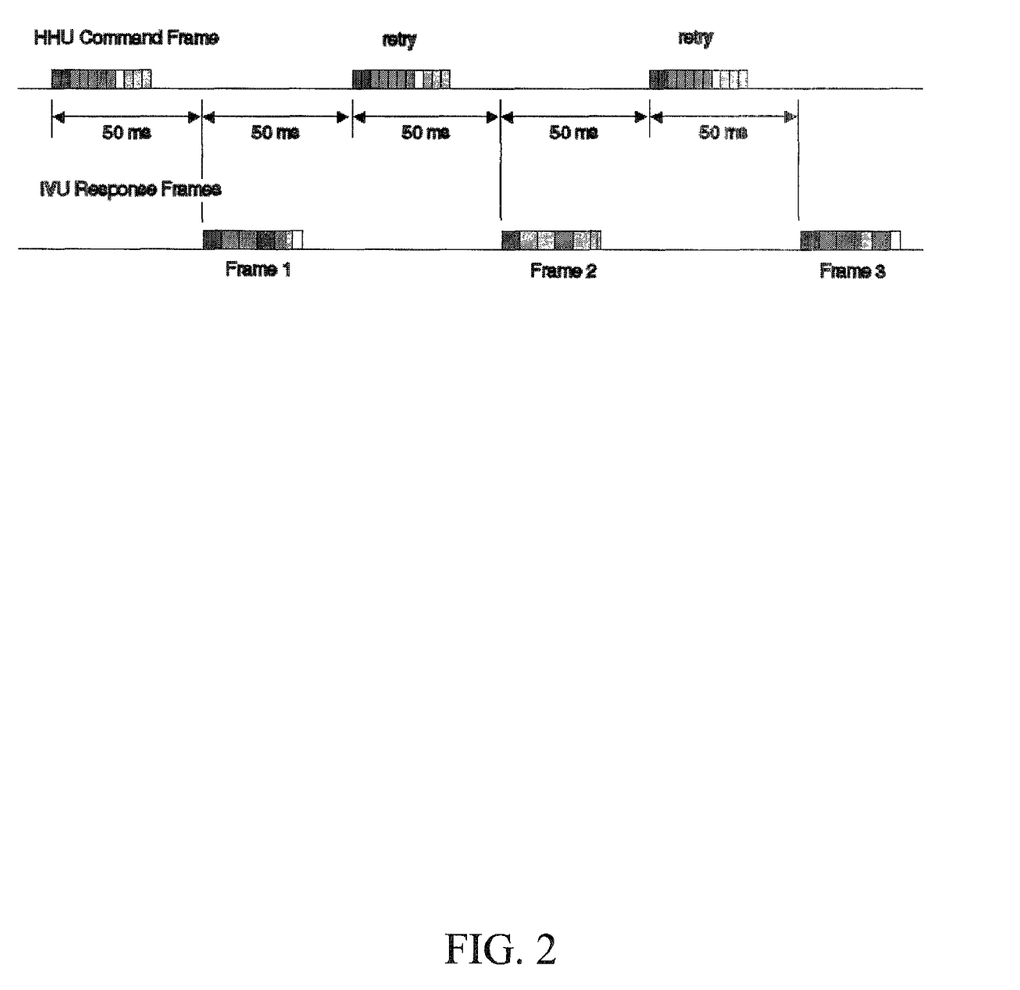
FIG. 2 illustrates an HHU command message and an IVU response message transmitted in response to the HHU command message according to an exemplary embodiment of the present invention.

FIG. 2 illustrates a command message sent by the HHU 105 (hereinafter referred to as an "HHU command message") and a response message sent by the IVU 110 (hereinafter referred to as an "IVU response message") in response to the HHU command message according to an exemplary embodiment of the present invention.

As shown in FIG. 2, when, for example, a user-initiated asynchronous HHU command message arrives at the IVU 110, a new communication session begins. During the session, all IVU bidirectional response frames (to be discussed hereinafter with reference to FIGS. 3-5) are sent within communication slots offset from the HHU command message by, for example, 50 ms, with 100 ms between frames. In other words, the response frames are interlaced/interleaved with inbound data. The HHU 105 does not receive response messages outside of this synchronized session window. When all response frames have been sent and there are not pending frames to be sent in response to a previous command such as a remote vehicle start sequence, the communication service is ended.

Figure 3:
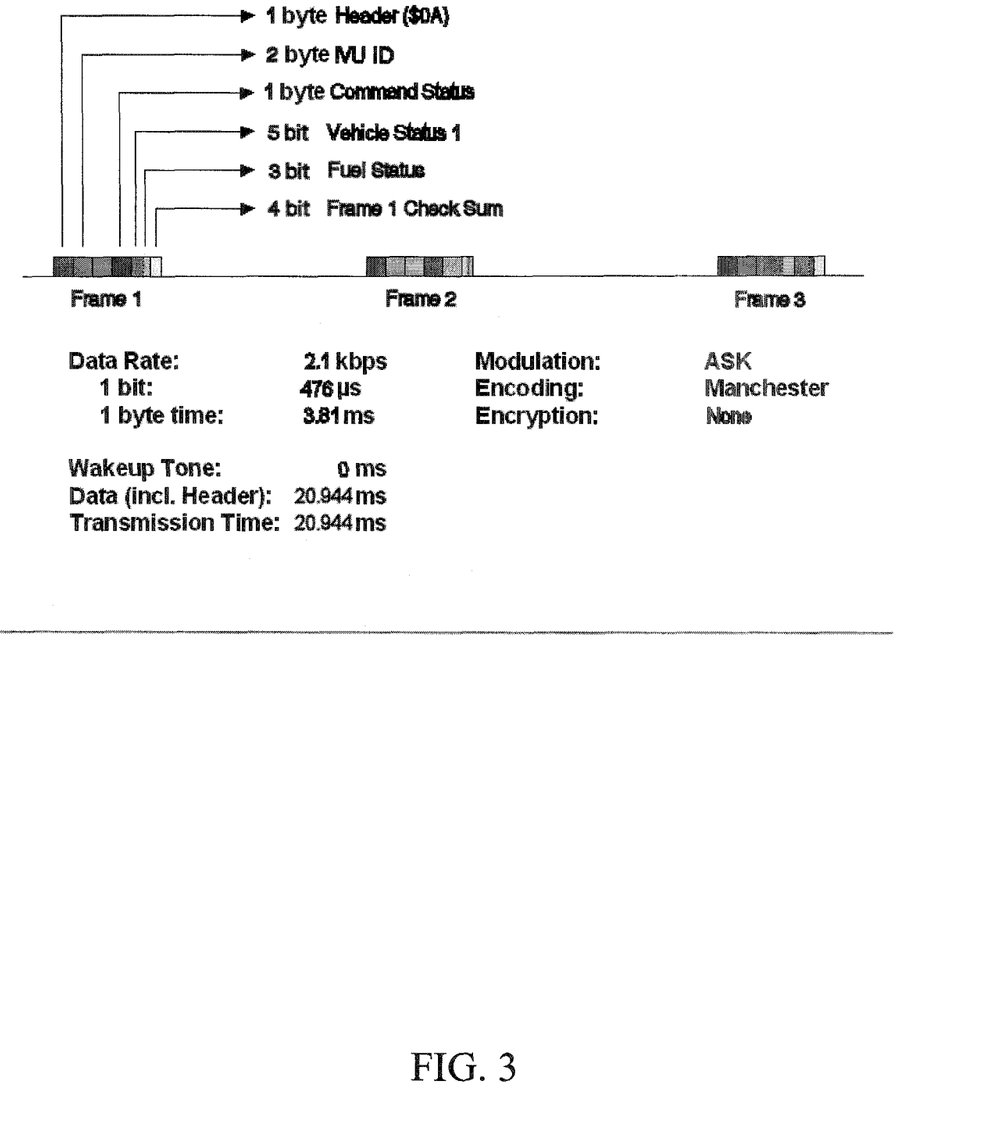
FIG. 3 illustrates the format of a first response frame of the IVU response message of FIG. 2.

FIG. 3 illustrates the format of a first response frame (Frame 1) of the IVU response message of FIG. 2.

As shown in FIG. 3, the first response frame is the only frame that contains the identification (ID) of the IVU 110 (IVU ID) and status of the last HHU command message received. This frame, including its checksum, is validated by the HHU 105 before the HHU 105 will accept any data received from the next two consecutive response frames. It is to be understood that all three frames of the response message are sent unencrypted.

Exemplary data items sent in the first response frame include Header, IVU ID, Command Status, Vehicle Status 1, Fuel Station and Frame Checksum.

With regard to Header, each IVU response message begins with a fixed Header Byte of value $0A.

With regard to IVU ID, a 16-bit IVU ID used to identify the response frames is generated from a 32-bit ID of the HHU 105 (HHU ID) attached to the command message to which the response frame is responding. Using the same Tiny Encryption Algorithm (TEA) decryption algorithm and Secret Key for the HHU command message decoding, the IVU ID is obtained as follows: (1) Concatenate two copies of the HHU ID to create a 64-bit number; (2) Use TEA decryption to transform this number into a 64-bit result; and (3) Take the middle 16 bits of the result and store in an EEPROM, associated with the HHU ID from which it was derived.

With regard to Command Status, each HHU command message the IVU 110 receives contains a Function Code to specify a command to be executed. An acknowledge bit (Ack) set in the Command Status byte confirms receipt of the command sent, allowing the display 115 of the HHU 105 to be updated accordingly. Each bit may acknowledge one of several related commands (shown below in parenthesis). A Radio Mode command is the sole exception, with no acknowledgement sent in response.

For bits b7-b0 of the Command Status Byte: b0=Unlock Ack (Driver Door Unlock, All Door Unlock, Comfort Open); b1=Lock Ack (All Door Lock, All Door Double Lock, Comfort Close); b2=Power Hatch Act (Power Liftgate Control); b3=Find/Panic Ack (Vehicle Locator, Panic Mode Activation/Deactivation), b4=Rear Closure Ack (Trunk/Liftglass Release); b5=Real Time Tire Gauge Ack; b6=RVS Start/Stop Ack (Remote Vehicle Start, Remote Vehicle Stop); and b7=Data Request Ack (Refresh HHU display data, HHU Setup Mode).

With regard to Vehicle Status 1, the IVU 110 monitors the vehicle network (e.g., the vehicle components 120 connected via the bus 125) for signals that include the status of prior commands sent to the vehicle 140. Vehicle Status 1 and Vehicle Status 2 (sent in the third response frame to be discussed hereinafter with reference to FIG. 5) communicate some of these parameters to the HHU 105. The status sent always reflects the latest values derived from the vehicle bus 125, regardless of the HHU command to which the response message is responding.

For bits b4-b0 of Vehicle Status 1: b0=English/Metric Status (0=English display, 1=Metric display); b1=Security Status (0=Unarmed, 1=Armed); b2=Power Hatch Status (0=Not Moving, 1=Moving); b3=RVS Status (0=Engine Off, 1=Engine On), and b4=reserved.

With regard to Fuel Status, three bits of data are sent to the HHU 105 to indicate the number of LCD display bars that should be activated on the HHU display 115 to graphically represent the amount of fuel remaining. The number of bars is derived form vehicle-supplied fuel-remaining percentages and the vehicle's fuel calibration table. Indication of a Low Fuel Warning prompts the flashing of an HHU fuel gauge on the display 115.

For bits b2-b0 of Fuel Status, the following table applies:

| | |
|---|---|
| 111 | Invalid data |
| 110 | 5 bars |
| 101 | 4 bars |
| 100 | 3 bars |
| 011 | 2 bars |
| 010 | 1 bar |
| 001 | Low Fuel Warning |
| 000 | Reserved |

With regard to Frame Checksum, a four-bit checksum is sent at the end of the first response frame to ensure the integrity of data in the frame. The checksum must match the data sent in this frame or the HHU 105 will discard the contents of this response frame and invalidate the two frames to follow.

Figure 4:
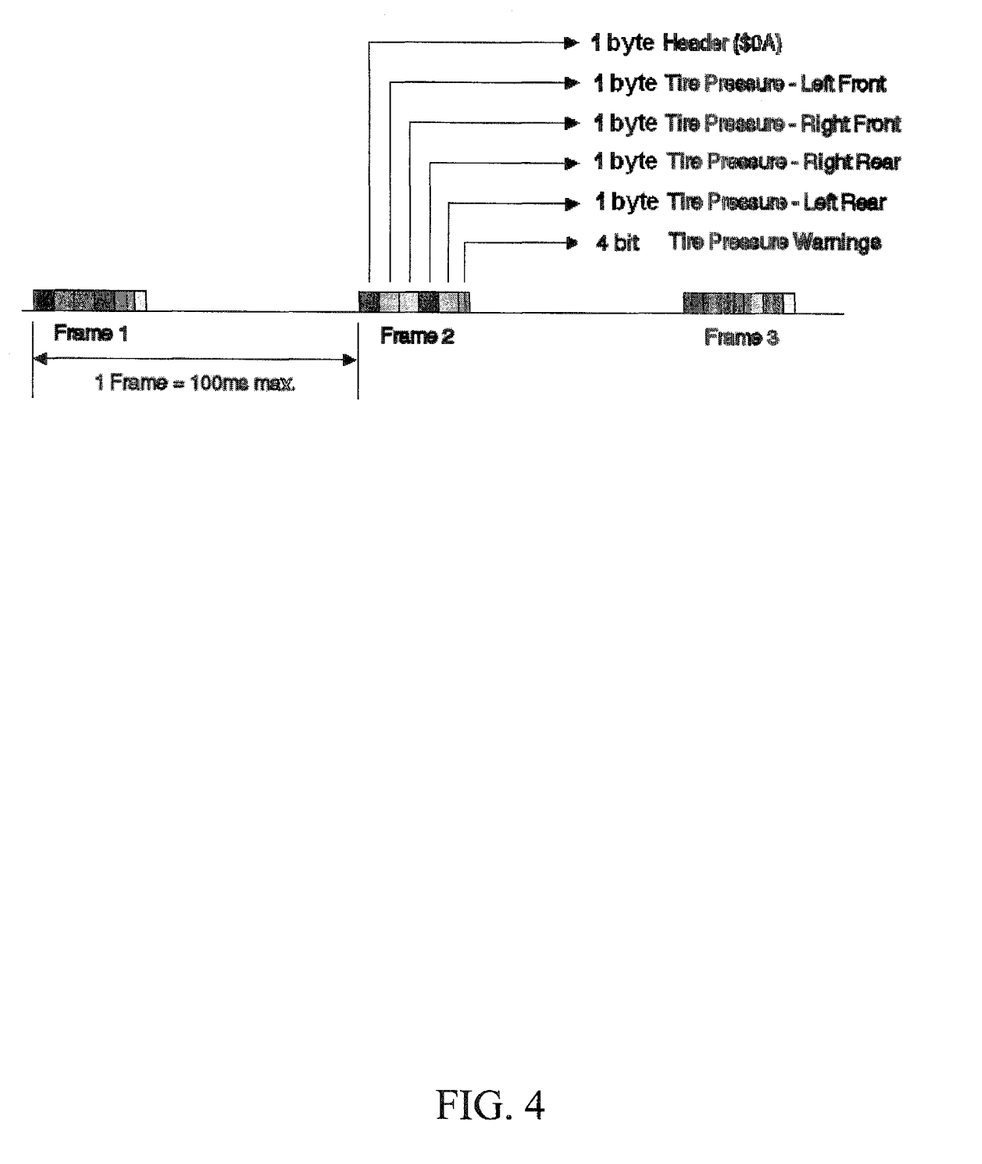
FIG. 4 illustrates the format of a second response frame of the IVU response message of FIG. 2.

FIG. 4 illustrates the format of a second response frame (Frame 2) of the IVU response message of FIG. 2.

Exemplary data items sent in the second response frame include Header, Tire Pressure Data and Tire Pressure Warnings.

With regard to Header, this response frame, like the first response frame, begins with a fixed Header Byte of value $0A.

With regard to Tire Pressure Data, four bytes of data represent tire pressures reported from tire pressure monitor sensors mounted inside each of the four wheels on the vehicle 140. The tire pressure data is sent in Metric units, with each count representing four kilopascals of relative pressure. If the pressure data is unavailable or invalid, a value of $FF is sent instead.

For eight bits of the left front tire, the following table applies.

| | |
|---|---|
| 0-1016 kilopascals | $00-$FE |
| Invalid | $FF |

For eight bits of the right front tire, the following table applies.

| | |
|---|---|
| 0-1016 kilopascals | $00-$FE |
| Invalid | $FF |

For eight bits of the right rear tire, the following table applies.

| | |
|---|---|
| 0-1016 kilopascals | $00-$FE |
| Invalid | $FF |

For eight bits of the right front tire, the following table applies.

| | |
|---|---|
| 0-1016 kilopascals | $00-$FE |
| Invalid | $FF |

With regard to Tire Pressure Warnings, four bits of data represent tire pressure warnings based on data from the tire pressure monitor sensors. The warning indicates either high or low pressures exceeding respective placard values calibrated to the vehicle 140 and prompts the HHU 105 to flash the tire pressure on the display 115 as shown in the following table.

| |
|---|
| Left Front Tire Warning 1 bit |
| Right Front Tire Warning 1 bit |
| Right Rear Tire Warning 1 bit |
| Left Rear Tire Warning 1 bit |

Figure 5:
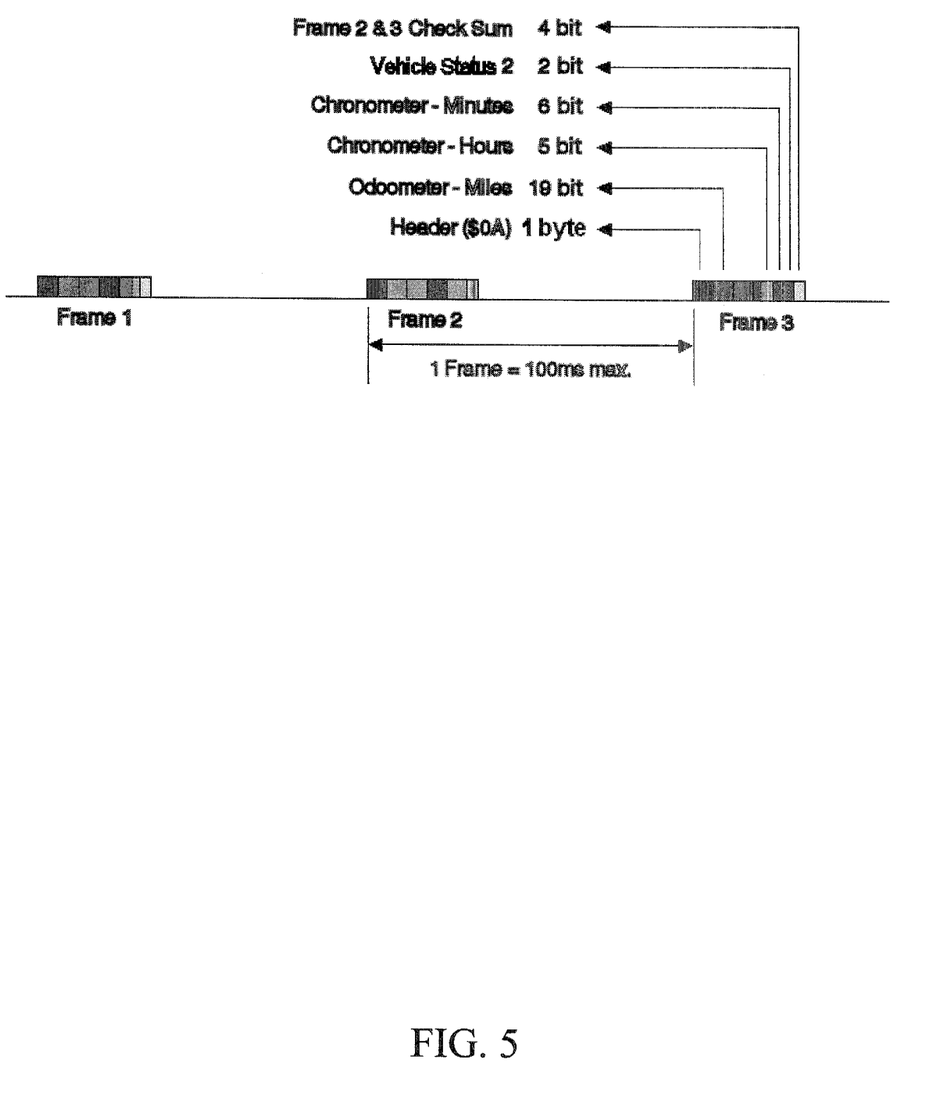
FIG. 5 illustrates the format of a third response frame of the IVU response message of FIG. 2.

FIG. 5 illustrates the format of a third response frame (Frame 3) of the IVU response message of FIG. 2.

Exemplary data items sent in the third response frame include Header, Odometer Data, Chronometer Data, Vehicle Status 2 and Frames 2 & 3 Checksum.

With regard to Header, the third response frame, like the first and second response frames, beings with a fixed Header Byte of value $0A.

With regard to Odometer Data, 19 bits of data are sent to represent the current odometer received from the vehicle 140. The odometer is sent in English units, with each count representing one mile. If the odometer data is unavailable or invalid, a value of $7FFFF is sent instead. An example of the odometer data is shown in the following table.

| | |
|---|---|
| 0-524.286 miles | $00-$7FFFE |
| Invalid | $7FFFF |

With regard to Chronometer Data, 11 bits of data are sent to represent the current time received from the vehicle 140. The time is sent in hours and minutes as indicated in the tables below. If the chronometer data is unavailable or invalid, a value of $7FF is sent instead. An example of the chronometer data is shown in the following tables.

| [Hours - five bits] | |
|---|---|
| 0-23 hours | $00-$17 |
| Invalid | $1F |

| [Minutes - six bits] | |
| --- | --- |
| 0-59 minutes | $00-$3B |
| Invalid | $3F |

With regard to Vehicle Status 2, the IVU 110 monitors the vehicle's network for signals that include the status of prior commands sent to the vehicle 140. Vehicle Status 1 (sent in the first response frame) and Vehicle Status 2 communicate some of these status items to the HHU 105. These status indicators reflect the latest values derived from the vehicle's bus 125, regardless of the HHU command to which the first response frame is responding. For bits b1-b0 of Vehicle Status 2, b0=reserved and b1=reserved.

With regard to Frames 2 & 3 Checksum, a four-bit checksum is sent at the end of the third response frame to ensure data integrity in the second and third response frames. The checksum must match the data sent in these two frames or the HHU 105 will discard the contents of both frames, while only acting on the first response frame's data is its checksum and the IVU ID sent were valid.

Figure 6:
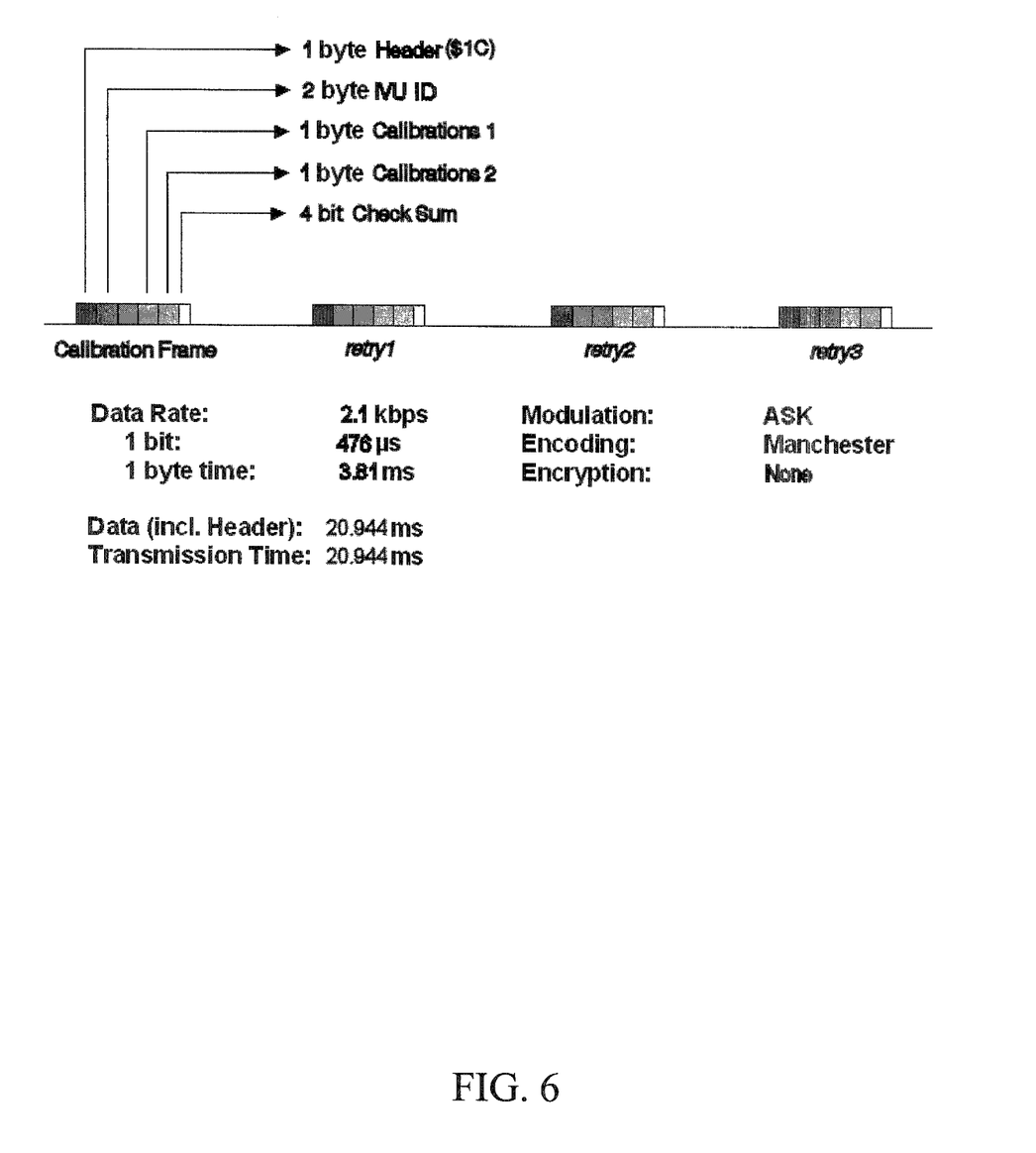
FIG. 6 illustrates IVU calibration frames according to an exemplary embodiment of the present invention.

FIG. 6 illustrates IVU calibration frames according to an exemplary embodiment of the present invention.

As shown in FIG. 6, upon validating a second consecutive Learn Message from an HHU 105 during a learn mode, or receiving valid Setup Mode request from an HHU 105 already learned to the IVU 110, the IVU 110 responds with, for example, four identical calibration frames, spaces 100 ms apart. The IVU 110 responds only once for each unique Learn or Setup message, regardless of the number of times the initiating message is sent by using a unique synchronization counter. The calibration frames are sent using the same offset message timing scheme used for the IVU bidirectional response frames discussed above with reference to FIGS. 2-5.

Exemplary data items sent in the calibration frames include Header, IVU ID, Calibrations 1, Calibrations 2, and Frame Checksum.

With regard to Header, each calibration frame begins with a fixed Header Byte of value $1C.

With regard to IVU ID, a 16-bit IVU ID used to identify the calibration frame is generated from a 32-bit HHU ID attached to the Learn Message or Setup Mode of the command that the calibration frame is responding. Using the same TEA decryption algorithm and Secret Key used for the HHU message decoding, the IVU ID is obtained as follows: (1) Concatenate two copies of the HHU ID to create a 64-bit number; (2) Use TEA decryption to transform this number into a 64-bit result; and (3) Take the middle 16 bits of the result and store in EEPROM, associated with the HHU ID it was derived from.

With regard to Calibrations 1, the following table applies.

| Calibrations - Byte 1 | 8 bits |
| --- | --- |
| Reserved 0 = default | $80 |
| Tire Icon Enable | $40 |
| Pwr Liftgate Icon Enable | $20 |
| Radio Icon Enable | $10 |
| Liftglass Icon Enable | $08 |
| Trunk Icon Enable | $04 |
| Data Request Enable | $02 |
| Unlock All Enable | $01 |

With regard to Calibrations 2, the following tables apply.

| Reserved 0 = default | 8 bits |
| --- | --- |
| Reserved 0 = default | $80 |
| Reserved 0 = default | $40 |
| Reserved 0 = default | $20 |
| Reserved 0 = default | $10 |
| Reserved 0 = default | $08 |
| Reserved 0 = default | $04 |
| Backlight On-Time b1 | $02 |
| Backlight On-Time b2 | $01 |

| Backlight On-Time | b1 | B0 |
| --- | --- | --- |
| 5 seconds | 0 | 0 |
| 10 seconds | 0 | 1 |
| 20 seconds | 1 | 0 |
| 30 seconds | 1 | 1 |

With regard to Frame Checksum, a 4-bit checksum is sent at the end of the calibration frame to ensure data integrity. The checksum must match the data sent in this frame or the HHU 105 will discard the contents of the calibration frame.

According to an exemplary embodiment of the present invention, during a normal operation between the HHU 105 and the IVU 110, each validated HHU command message results in the wireless transmission of three response frames, spaced 100 ms apart, from the IVU 110. In this embodiment, the IVU 110 responds only once to each unique command from the HHU 105, regardless of the number of retries sent to the IVU 110, while the synchronization counter remains unchanged. The three response frames are transmitted in order, and are repeated in their entirety three times if no other validated HHU command is received in the interim. In doing so, the amount of time it takes to send response data from the IVU 110 to the HHU 105 is reduced such that there is essentially no perceptible delay in actions performed by the vehicle 140 and feedback reaction by the HHU 105.

It is to be understood that additional data items may be included in the above-described response frames. The data items may include ignition cycle, miles driven in last ignition cycle or since last trip reset, trip odometer value, vehicle temperature interior/exterior, oil life remaining, washer fluid level/low fluid level warning, door open/closed status, time of day start, temperature at start, and security system trigger status.

It is further understood that although the above-described response frames are sent within communication slots offset from an HHU command message by 50 ms, with 100 ms between frames, the present invention is not limited thereto. For example, the communication slots can be offset from an HHU command message by 75 ms, with 150 ms between frames.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture. For example, the application program may be included in a cell phone or some other type of personal communication device such as a Blackberry.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A vehicle control system communication method, comprising:
   receiving, at an in-vehicle unit (IVU), a command message from a hand-held unit (HHU), wherein the command message includes first to third command frames; and
   sending, from the IVU, a response message to the HHU, wherein the response message includes first and second response frames,
   wherein the first response frame is sent in a time period between the reception of the first and second command frames and the second response frame is sent in a time period between the reception of the second and third command frames, and
   wherein the first to third command frames each instruct a vehicle to perform a first function, and the first response frame includes a status of the vehicle related to the first function and an identification (id) of the IVU which is validated by the HHU prior to accepting data from the second response frame, and the second response frame includes current vehicle gauge data.

2. The method of claim 1, wherein the time period between the reception of the first command frame and the reception of the second command frame is approximately 100 ms or approximately 150 ms.

3. The method of claim 1, wherein the first response frame is sent approximately 50 ms or approximately 75 ms after the first command frame is received.

4. The method of claim 1, wherein the time period between the reception of the second command frame and the reception of the third command frame is approximately 100 ms or approximately 150 ms.

5. The method of claim 1, wherein the second response frame is sent approximately 50 ms or approximately 75 ms after the second command frame is received.

6. The method of claim 1, wherein when the IVU receives the first command frame from the HHU a communication session begins and when the HHU receives a last response frame from the IVU the communication session ends.

7. The method of claim 6, wherein when the communication session ends, the HHU does not receive another response message from the IVU until another communication session begins.

8. The method of claim 1, wherein the response message is sent a predetermined number of times.

9. The method of claim 1, further comprising:
   validating, at the IVU, a learn command message received from the HHU or a valid setup request from an HHU already learned, by sending, from the IVU, a series of calibration frames to the HHU, wherein each calibration frame comprises the IVU id, a first calibration byte, a second calibration byte and a checksum.

10. The method of claim 9, wherein the series of calibration frames is sent approximately 100 ms or approximately 150 ms apart.

11. The method of claim 1, wherein the command message and the response message are wirelessly transmitted using radio frequency (RF), ZigBee, Near Field Communication (NFC), Bluetooth, ultra-wide band or infrared techniques.

12. The method of claim 1, further comprising obtaining the IVU id, wherein the obtaining comprises:
   concatenating two copies of an id of the HHU to create a 64-bit number;
   transforming the 64-bit number into a 64-bit result by decryption; and
   taking a middle 16-bits of the 64-bit result as the IVU id.

13. The method of claim 1, wherein the response message further includes a third response frame sent after the third command frame is received by the IVU, the third response frame including a checksum and vehicle gauge data different from the vehicle gauge data of the second response frame, the first response frame further including a checksum,
   wherein the data of the first response frame is accepted at the HHU in response to validation of the IVU id and the checksum of the first response frame and the data of the second and third response frames is accepted at the HHU in response to validation of the checksum of the third response frame.

14. A vehicle control system, comprising:
   a hand held unit (HHU) for transmitting a first to third command frames, wherein the first to third command frames each direct a vehicle to perform a first function; and
   an in-vehicle unit (IVU) for receiving the first to third command frames and sending first and second response frames to the HHU, wherein the first response frame is sent in a time period between the reception of the first and second command frames and includes a status of the vehicle related to the first function and an identification (id) of the IVU which is validated by the HHU prior to accepting data from the second response frame, and the second response frame is sent in a time period between the reception of the second and third command frames and includes current vehicle gauge data.

15. The system of claim 14, further comprising:
   a vehicle control module for receiving a command from the IVU associated with the first to third command frames received from the HHU and for instructing vehicle components to execute functions in accordance with the command received from the IVU.

16. The system of claim 15, wherein the vehicle control module communicates with the vehicle components via a vehicle data bus.

17. The system of claim 16, wherein the vehicle data bus is a controller area network (CAN) data bus.

18. The system of claim 15, wherein a vehicle component executes a function in accordance with the command received from the IVU in response to the instruction of the vehicle control module.

19. The system of claim 14, wherein the IVU instructs the vehicle components to execute functions associated with the first to third command frames received from the HHU.

20. The system of claim 19, wherein the IVU communicates with the vehicle components via a vehicle data bus.

21. The system of claim 20, wherein the vehicle data bus is a CAN data bus.

22. The system of claim 19, wherein a vehicle component executes a function associated with the first to third command frames received from the HHU in response to a command received from the IVU.

23. The system of claim 14, wherein when the IVU is hardwired to vehicle components, the IVU instructs the vehicle components to execute functions associated with the first to third command frames received from the HHU via the hardwired connection.

24. The system of claim 23, wherein a vehicle component executes a function associated with the first to third command frames received from the HHU in response to a command received from the IVU via the hardwired connection.

25. The system of claim 14, wherein the first to third command frames and the first and second response frames are wirelessly transmitted using radio frequency (RF), ZigBee, Near Field Communication (NFC), Bluetooth, ultra-wide band or infrared techniques.

26. A method for wirelessly communicating between a remote transceiver and a vehicle control system, comprising:
receiving, at a vehicle control unit, a command message from a remote transceiver, wherein the command message includes first to third command frames; and
sending, from the vehicle control unit, a response message to the remote transceiver, wherein the response message includes first and second response frames,
wherein the first response frame is interleaved between the first and second command frames and the second response frame is interleaved between the second and third command frames, and
wherein the first to third command frames each instruct a vehicle to perform a first function, and the first response frame includes a status of the vehicle related to the first function and an identification (id) of the vehicle control unit which is validated by the remote transceiver prior to accepting data from the second response frame, and the second response frame includes current vehicle gauge or diagnostic data.

* * * * *